United States Patent
Sridhara et al.

(10) Patent No.: US 9,395,189 B2
(45) Date of Patent: Jul. 19, 2016

(54) INDOOR STRUCTURE INFERENCE USING POINTS OF INTEREST

(75) Inventors: Vinay Sridhara, Santa Clara, CA (US); Hui Chao, San Jose, CA (US); Saumitra Mohan Das, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 730 days.

(21) Appl. No.: 13/530,051

(22) Filed: Jun. 21, 2012

(65) Prior Publication Data

US 2013/0342565 A1    Dec. 26, 2013

(51) Int. Cl.
| | |
|---|---|
| *G01S 5/00* | (2006.01) |
| *G01C 21/20* | (2006.01) |
| *G01S 5/02* | (2010.01) |
| *G01C 21/32* | (2006.01) |

(52) U.S. Cl.
CPC ............. *G01C 21/206* (2013.01); *G01S 5/0236* (2013.01); *G01S 5/0252* (2013.01); *G01C 21/32* (2013.01)

(58) Field of Classification Search
None
See application file for complete search history.

(56) References Cited

U.S. PATENT DOCUMENTS

| | | | | |
|---|---|---|---|---|
| 4,894,844 | A * | 1/1990 | Forney, Jr. ...................... | 375/269 |
| 8,538,442 | B1 * | 9/2013 | Ettinger .............. | H04W 40/244 455/446 |
| 2005/0096068 | A1 | 5/2005 | Bahl et al. | |
| 2007/0001904 | A1 | 1/2007 | Mendelson | |
| 2008/0012767 | A1 | 1/2008 | Caliri et al. | |
| 2009/0043502 | A1 | 2/2009 | Shaffer et al. | |
| 2009/0043504 | A1 | 2/2009 | Bandyopadhyay et al. | |
| 2009/0292394 | A1 | 11/2009 | Hyung et al. | |
| 2011/0010093 | A1 * | 1/2011 | Partridge .............. | G01S 5/0252 701/300 |
| 2011/0080848 | A1 | 4/2011 | Khorashadi et al. | |
| 2011/0081919 | A1 * | 4/2011 | Das et al. ................... | 455/456.1 |
| 2011/0090123 | A1 * | 4/2011 | Sridhara et al. ............... | 342/450 |
| 2011/0306354 | A1 * | 12/2011 | Ledlie et al. ............... | 455/456.1 |
| 2012/0007779 | A1 | 1/2012 | Klepal et al. | |
| 2013/0166193 | A1 * | 6/2013 | Goldman et al. ............ | 701/410 |
| 2013/0261964 | A1 * | 10/2013 | Goldman et al. ............ | 701/500 |

OTHER PUBLICATIONS

Lee, Minkyu, and Dongsoo Han. "Voronoi tessellation based interpolation method for Wi-Fi radio map construction." Communications Letters, IEEE 16.3 (2012): 404-407.Date of Publication : Feb. 10, 2012.*

Alani, Harith, Christopher B. Jones, and Douglas Tudhope. "Voronoi-based region approximation for geographical information retrieval with gazetteers." International Journal of Geographical Information Science 15.4 (2001): 287-306.*

(Continued)

*Primary Examiner* — Xiao Wu
*Assistant Examiner* — Yu Chen
(74) *Attorney, Agent, or Firm* — Berkeley Law & Technology Group, LLP

(57) ABSTRACT

In one implementation, a method may comprise: obtaining a digital map of an indoor region that identifies boundaries between subsections within the indoor region; and approximating locations of walls separating rooms within at least one of the subsections based, at least in part, on locations of feature labels provided in the digital map.

41 Claims, 9 Drawing Sheets

(56) References Cited

OTHER PUBLICATIONS

Fortune S.J. et al., "Wise design of indoor wireless systems: practical, computation and optimization", IEEE Computational Science & Engineering, IEEE Computer Society, US, vol. 2, No. 1, Jan. 1, 1995, pp. 58-68, XP002175089, ISSN: 1070-9924, DOI: 10.1109/99.372944, the whole document.

International Search Report and Written Opinion—PCT/US2013/045752—ISA/EPO—Aug. 26, 2013.

Lee, M., et al., "Voronoi Tessellation Based Interpolation Method for Wi-Fi Radio Map Construction", IEEE Communications Letters, IEEE Service Center, Piscataway, NJ, US, vol. 16, No. 3, Mar. 1, 2012, pp. 404-407, XP011430088, ISSN: 1089-7798, DOI: 10.1109/LCOMM.2012.020212.111992, the whole document.

Wang H, et al., "Enhancing the Map Usage for Indoor Location-Aware Systems", Human-computer interaction, Part2, HCII 2007. LNCS 4551, Jul. 2007, pp. 151-160, XP019062491.

\* cited by examiner

INDOOR STRUCTURE INFERENCE USING POINTS OF INTEREST

BACKGROUND

1. Field

The subject matter disclosed herein relates to wireless communication systems, and more specifically, to position determination methods and apparatuses for use with and/or by wireless mobile stations.

2. Information

GPS and other like satellite positioning systems have enabled navigation services for mobile handsets in outdoor environments. Since satellite signals may not be reliably received or acquired in an indoor environment, different techniques may be employed to enable navigation services. For example, mobile stations may obtain a position fix by measuring ranges to three or more terrestrial wireless access points that are positioned at known locations. Such ranges may be measured, for example, by obtaining a MAC ID address from signals received from such access points and obtaining range measurements to the access points by measuring one or more characteristics of signals received from such access points such as, for example, signal strength and round trip delay.

A navigation system may provide navigation assistance or mapped features to a mobile station as it enters a particular area. For example, in some implementations, an indoor navigation system may selectively provide assistance information to mobile stations to facilitate and/or enable location services. Such assistance information may include, for example, information to facilitate measurements of ranges to wireless access points at known fixed locations. For example, "radio heatmap" data indicating expected received-signal-strength-indicator (RSSI) or round-trip time (RTT) values associated with access points may enable a mobile station to associate signal measurements with locations in an indoor area. By matching measured RSSI or RTT values of acquired signals marked with particular MAC IDs with the RSSI or RTT values expected for signals marked by these particular MAC IDs at a specific location, the location of the receiver may be inferred to be at the specific location.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
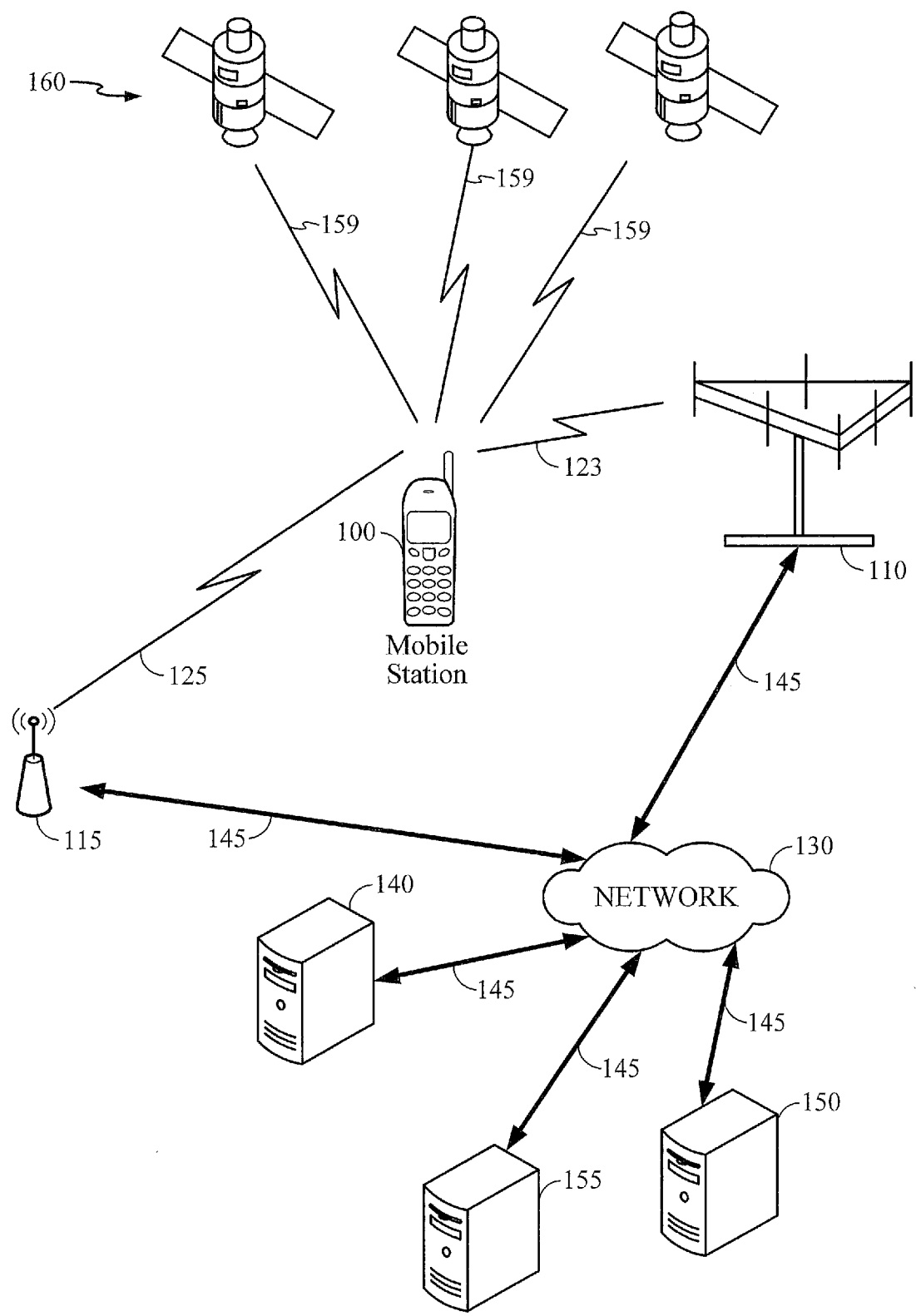
FIG. 1 is a system diagram illustrating certain features of a system containing a mobile station, in accordance with an implementation.

In some implementations, a method may comprise: obtaining from a memory a digital map of an indoor region that identifies boundaries between subsections within said region; and approximating locations of walls separating rooms within at least one of said subsections based, at least in part, on locations of feature labels provided in said digital map.

In other implementations, an apparatus may comprise: means for obtaining a digital map of an indoor region that identifies boundaries between subsections within said region; and means for approximating locations of walls separating rooms within at least one of said subsections based, at least in part, on locations of feature labels provided in said digital map.

In still other implementations, an apparatus may comprise: a receiver to receive wireless signals; and one or more processing units to: approximate locations of walls separating rooms within at least one of multiple subsections based, at least in part, on locations of feature labels provided in a digital map received through said receiver, wherein said digital map comprises a map of an indoor region that identifies boundaries between said subsections within said indoor region.

In yet other implementations, an article may comprise: a non-transitory storage medium comprising machine-readable instructions stored thereon that are executable by a special purpose computing device to: evaluate a digital map of an indoor region to identify boundaries between subsections within said region; and approximate locations of walls separating rooms within at least one of said subsections based, at least in part, on locations of feature labels provided in said digital map.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature", or "a feature" in various places throughout this specification are not necessarily all referring to the same feature and/or example. Furthermore, the particular features, structures, or characteristics may be combined in one or more examples and/or features.

As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile station which is capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

An access point (AP) may comprise a land-based wireless transmitter that allows an MS, among other wireless devices, to connect to a wired network using Wi-Fi, Bluetooth, or any of a number of other standards, for example. In one implementation, an AP may comprise a personal area network transceiver such as Bluetooth or Zigbee transceivers, for example. In another implementation, an AP may comprise a femto cell, and both terms "AP" and "femto cell" may be used interchangeably unless otherwise indicated. Further, an AP may comprise a base station. In still another implementation, an AP may comprise a wireless network access point, and both terms "AP" and "wireless network access point" may be used interchangeably unless otherwise indicated wireless network access point. For example, a wireless network access point may comprise a network access point to allow one or more MSs to access wireless services, though claimed subject matter is not limited in this respect. A plurality of APs may be placed in a variety of known locations in an area such as an office building, shopping mall, suburban or urban area, and so on.

In some implementations, an indoor navigation system may selectively provide assistance information to an MS to facilitate and/or enable location services. Such assistance information may include, for example, information to facilitate measurements of ranges to wireless access points at known fixed locations. For example, "radio heatmap" data indicating expected received-signal-strength-indicator (RSSI) values or round-trip times (RTT) associated with access points may enable an MS to associate signal measurements with locations in an indoor area. Additionally, such assistance data may also include routeability information indicative of feasible/navigable paths in an indoor area covered by a digital map.

In a particular implementation, assistance information may be provided to an MS from a local server through wireless communication links. The MS may then locally store received assistance information in a local memory. It should be understood, however, that in larger indoor areas with multiple access points and feasible routes, such assistance information may be quite voluminous so as to tax available bandwidth in wireless communication links and data storage space on mobile stations.

RSSI or RTT values measured from an acquired transmission signal may comprise parameters that correspond to signal loss and may indicate a distance traveled by the transmission signal. For example, RTT may increase as the travel distance of a signal increases. In another example, RSSI may decrease as the travel distance of a signal increases. In some cases, one or more propagation parameters may be used to predict or infer, at least in part, signal loss over distance. Such signal loss, for example, may comprise exponential or linear signal degradation, though claimed subject matter is not so limited.

A radio heatmap may comprise a collection of radio heatmap values corresponding to expected RSSI or RTT values at particular locations (e.g., grid points) represented by the radio heatmap. For example, a radio heatmap may comprise heatmap values individually corresponding to particular grid points or relatively small areas of a region represented by a map of the region. Such a map may comprise a plurality of electronic signals representative of physical locations of a region and expected RSSI or RTT values for the physical locations. In a particular example, an RSSI heatmap of a shopping mall or office building may comprise a map of the shopping mall or office building including expected RSSI measurements for various locations (e.g., grid points) of the shopping mall or office building.

According to an implementation, assistance information may be provided to an MS in a compressed format. For example, such assistance information may be provided as metadata along with metadata included in a digital map. Here, grid points may be laid over locations in an indoor interval at uniform spacing (e.g., two-foot separation of neighboring grid points). Heatmap or connectivity information may be provided for individual grid points in metadata organized by rows, for example. In one implementation, a single row may include values for RSSI, RSSI variances (e.g., standard deviation or other uncertainty characteristics of RSSI values), RTT, and RTT variances for associated access points. Here, the access points may be represented by their MAC ID addresses, for example. In one particular implementation, an RSSI heatmap value and associated variance may be represented by one byte each while a delay heatmap value and associated variance may be represented by two bytes each, though claimed subject matter is not limited in this respect. Additionally, a single field may indicate connectivity (i.e., a feasible path) with adjoining grid points (e.g., Boolean 1 or 0 to indicate whether there is connectivity with an associated grid point). Accordingly, heatmap data indicating expected RSSI or RTT values associated with access points may enable an MS to associate signal measurements with locations in an indoor area. By matching measured RSSI or RTT values of acquired signals marked with particular MAC IDs with expected RSSI or RTT values for signals marked by these particular MAC IDs at a specific location, the location of the MS may be inferred to be at the specific location.

In one implementation, an MS may determine RTT values by transmitting a probe signal and measuring an elapsed time until the MS receives an acknowledging response from one or more access points. For example, an MS may identify individual access points using a MAC ID of the individual access points. An MS may infer its distance to a particular access point based, at least in part, on an RTT value comprising the elapsed time between probe signal transmission and a probe signal response from the particular access point. Such an elapsed time may comprise travel time of the probe signal and the probe signal response in addition to a process delay at the access point. For example, such a process delay may include a time that it takes for an access point to receive a probe signal and to process and transmit a probe response signal. In some cases, RTT values may be affected by multi-path signals, wherein an MS may receive a probe response signal from an access point via more than one path. In such a case, different RTT values may arise for different signal paths. In one implementation, the shortest signal path (e.g., the smallest RTT value) or the strongest (e.g., highest signal amplitude) received probe signal may be considered to be associated with a line-of-sight path, which an MS may use to infer distance to an access point.

Various techniques are described herein which may be implemented in one or more land-based computing platforms or a mobile station (MS) to infer locations of walls or other indoor structures of a building based, at least in part, on feature labels in a map of the building. Locations of walls or other building structures may be used for computing values in a radio heatmap, for example. In particular, values in a radio heatmap database may be computed based, at least in part, on locations of transmitters and an approximation of locations of walls. A radio heatmap, as described above, for example, may comprise radio positioning assistance information to enable an MS to determine its position. For example, a radio heatmap may comprise expected RSSI values and variance of expected RSSI values, among other things.

Of course, knowledge of wall locations in a building may be useful for a number of other reasons. For example, pathways or routeability for an indoor region may be determined based, at least in part, on approximated locations of walls. In a particular implementation, one or more routes from a first point to a second point may be determined by considering wall or door locations.

In one implementation, locations of walls separating rooms may be approximated based, at least in part, on locations of feature labels provided in a digital map. For example, a digital map of an indoor region may identify boundaries between subsections within the indoor region. However, such a digital map may lack features of indoor structures such as doors, hallways, entry ways, or walls, for example. Though such a digital map may lack some indoor structure features, the digital map may include feature labels, such as bathrooms, pay phones, room names, stores or store names, and so on.

In a hierarchical scheme, a building or building complex may include one or more subsections, which may include one or more rooms, hallways, closets, or chambers, just to name a few examples. In a particular example, a building may comprise a shopping mall that includes a number of subsections. In such a case, subsections may comprise a single relatively large store (e.g., an anchor store) or several or more (e.g., three to several dozen) smaller stores. In a particular implementation, it may be assumed that single walls separate adjacent stores from one another. Of course, such a description of a building, subsections, and rooms is merely an example, and claimed subject matter is not limited in this respect.

In one implementation, approximating locations of walls may involve a technique of Tessellation. For example, Tessellation may comprise a process of creating a two-dimensional plane using a repetition of one or more geometric shapes with no overlaps and no gaps. In a particular implementation, polygons may be superimposed over one or more subsections of a map of a building. For example, such polygons may comprise Voronoi cells. As explained in detail below, approximating locations of walls of a subsection may be based, at least in part, on such polygons.

In certain implementations, as shown in FIG. 1, an MS 100 may receive or acquire SPS signals 159 from SPS satellites 160. In some implementations, SPS satellites 160 may be from one global navigation satellite system (GNSS), such as the GPS or Galileo satellite systems. In other implementations, the SPS Satellites may be from multiple GNSS such as, but not limited to, GPS, Galileo, Glonass, or Beidou (Compass) satellite systems. In other implementations, SPS satellites may be from any one several regional navigation satellite systems (RNSS') such as, for example, WAAS, EGNOS, QZSS, just to name a few examples.

In addition, the MS 100 may transmit radio signals to, and receive radio signals from, a wireless communication network. In one example, MS 100 may communicate with a cellular communication network by transmitting wireless signals to, or receiving wireless signals from, a base station transceiver 110 over a wireless communication link 123. Similarly, MS 100 may transmit wireless signals to, or receiving wireless signals from a local transceiver 115 over a wireless communication link 125.

In a particular implementation, local transceiver 115 may be configured to communicate with MS 100 at a shorter range over wireless communication link 123 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on link 125 according to a cellular communication protocol. Of course, it should be understood that these are merely examples of networks that may communicate with an MS over a wireless link, and claimed subject matter is not limited in this respect.

In a particular implementation, base station transceiver 110 and local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between MS 100 and servers 140, 150 or 155 through local transceiver 115 or base station transceiver 110. In another implementation, network 130 may comprising cellular communication network infrastructure such as, for example, a base station controller or master switching center to facilitate mobile cellular communication with MS 100.

In particular implementations, and as discussed below, MS 100 may have circuitry and processing resources capable of computing a position fix or estimated location of MS 100. For example, MS 100 may compute a position fix based, at least in part, on pseudorange measurements to four or more SPS satellites 160. Here, MS 100 may compute such pseudorange measurements based, at least in part, on pseudonoise code phase detections in signals 159 acquired from four or more SPS satellites 160. In particular implementations, MS 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, MS 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from MS 100 may be measured to three or more of such terrestrial transmitters fixed at known locations based, at least in part, on pilot signals transmitted by the transmitters fixed at known locations and received at MS 100. Here, servers 140, 150 or 155 may be capable of providing positioning assistance data to MS 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, MS 100 may not be capable of acquiring signals 159 from a sufficient number of SPS satellites 160 or perform AFLT or OTDOA to compute a position fix. Alternatively, MS 100 may be capable of computing a position fix based, at least in part, on signals acquired from local transmitters (e.g., femto cells or WLAN access points positioned at known locations), such as access point 605 shown in FIG.

Figure 6:
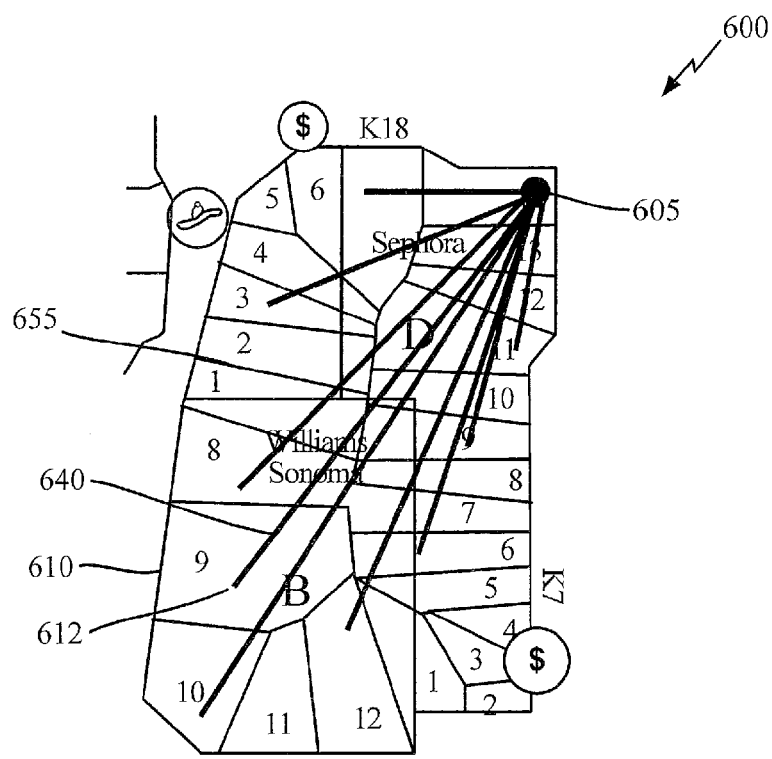
FIG. 6 is a map of a portion of a building complex including approximated wall locations, according to an implementation.

6. For example, MSs may obtain a position fix by measuring ranges to three or more indoor terrestrial wireless access points which are positioned at known locations, as shown in FIG. 6. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, MS 100 may obtain an indoor position fix by applying characteristics of acquired signals to a radio heatmap indicating expected RSSI or RTT values at particular locations in an indoor area.

In particular implementations, MS 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, locations and identities of transmitters, routeability graphs, just to name a few examples. Other assistance data received by the MS may include, for example, local maps of indoor areas for display or to aid in navigation. Such a map may be provided to MS 100 as MS 100 enters a particular indoor area. Such a map may show indoor features such as doors, hallways, entry ways, walls, etc., points of interest such as bathrooms, pay phones, room names, stores, etc. By obtaining and displaying such a map, an MS may overlay a current location of the MS (and user) over the displayed map.

In one implementation, a routeability graph and/or digital map may assist MS 100 in defining feasible areas for navigation within an indoor area and subject to physical obstructions (e.g., walls) and passage ways (e.g., doorways in walls). Here, by defining feasible areas for navigation, MS 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular implementation, MS 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of MS 100.

According to an implementation, MS 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at MS 100 and data transmission resources may make receipt of indoor navigation assistance data for all areas served by servers 140, 150 or 155 impractical or infeasible, a request for indoor navigation assistance data from MS 100 may indicate a rough or course estimate of a location of MS 100. MS 100 may then be provided indoor navigation assistance data covering areas including and/or proximate to the rough or course estimate of the location of MS 100.

In one particular implementation, a request for indoor navigation assistance data from MS 100 may specify a location context identifier (LCI). Such an LCI may be associated with a locally defined area such as, for example, a particular floor of a building or other indoor area which is not mapped according to a global coordinate system. In one example server architecture, upon entry of an area, MS 100 may request a first server, such as server 140, to provide one or more LCIs covering the area or adjacent areas. Here, the request from the MS 100 may include a rough location of MS 100 such that the requested server may associate the rough location with areas covered by known LCIs, and then transmit those LCIs to MS 100. MS 100 may then use the received LCIs in subsequent messages with a different server, such as server 150, for obtaining navigation assistance relevant to an area identifiable by one or more of the LCIs as discussed above (e.g., digital maps, locations and identifies of beacon transmitters, radio heatmaps or routeability graphs).

Figure 2:
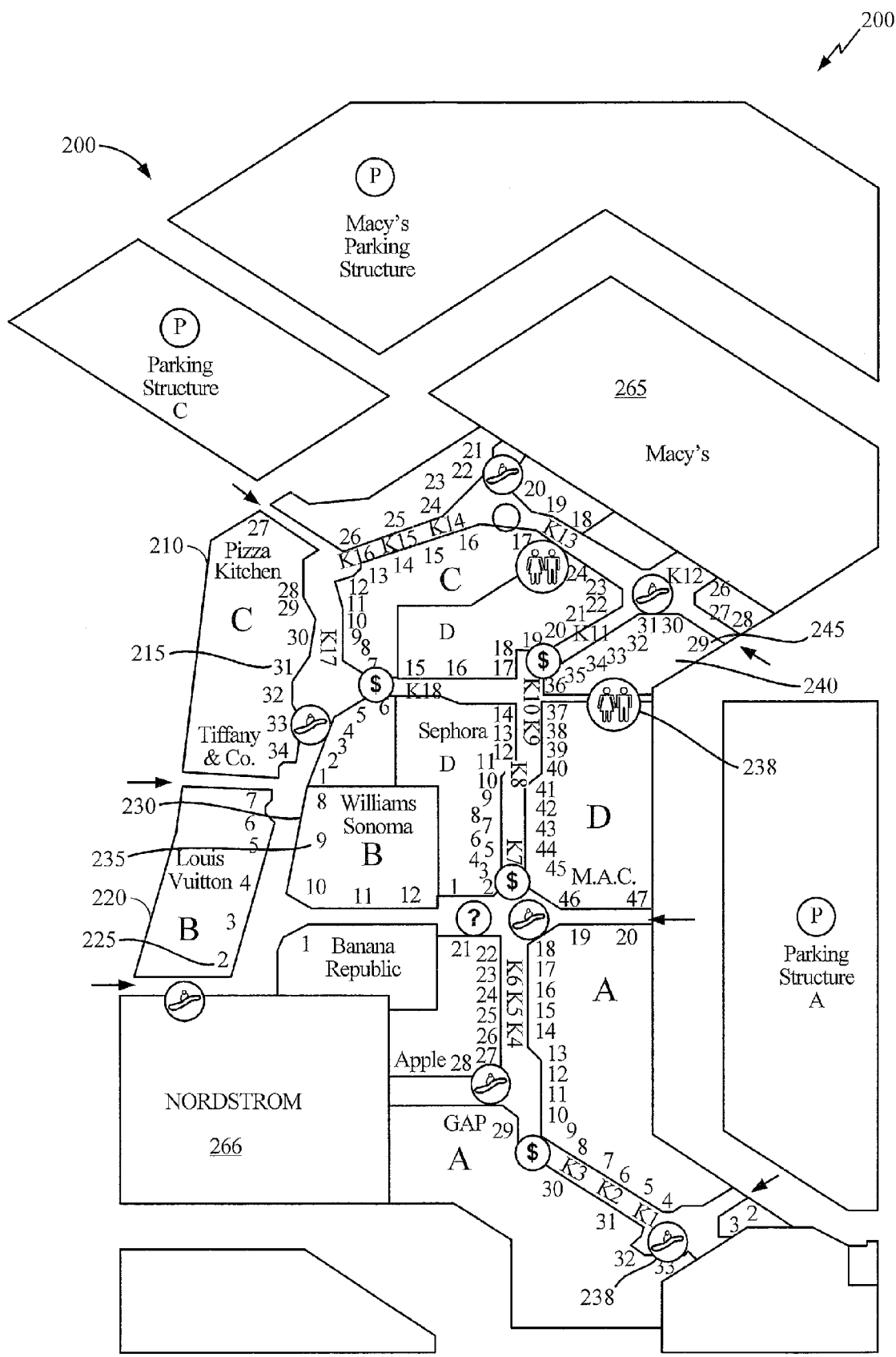
FIG. 2 is a map of a building complex, according to an implementation.

FIG. 2 is a map 200 of a building complex 205, according to an implementation. Map 200 (e.g., a digital map) may comprise a vector graphics file format used to store digital images in a memory. For example, map 200 may comprise a collection of bits in any of a number of image file formats, such as a Joint Photographic Experts Group (JPEG) format, Tagged Image File Format (TIFF), or Graphics Interchange Format (GIF), just to name a few examples. The terms "building complex" and "building" are herein used interchangeably. For example, a building may comprise one or more structures separated by walkways, roads, paths, and so on.

Map 200 may include feature labels to identify various elements of the map. For example, feature labels may comprise numbers "1" through "34" in portion "C" to identify individual stores 215. In another example, feature labels 238 may comprise icons to identify restrooms, stairs, and so on.

Building 205 may comprise a shopping mall, for example. As mentioned above, in a hierarchical scheme, building 205 may include one or more subsections, such as subsections 210, 220, 230, and 240, for example. Individual subsections may comprise several or more (e.g., three to several dozen) relatively small stores. Subsections may also comprise a single anchor store, such as anchor stores 265 and 266. The term "anchor store" means a relatively large store (e.g., a department store) having a size that may be at least several or a dozen times larger than surrounding stores. Subsections (e.g., 265 and 266) comprising anchor stores may comprise multiple walls that separate multiple rooms, hallways, and so on. Similarly, subsections (e.g., 210, 220, 230, and 240) comprising multiple relatively small stores may include multiple walls that separate multiple rooms, hallways, and so on. On the other hand, for some processes or techniques described below, it may be assumed that single walls separate adjacent stores from one another. Of course, such descriptions of a building, subsections, and rooms are merely examples, and claimed subject matter is not limited in this respect.

Subsections, such as 210, 220, 230, and 240, may include multiple stores. For example, subsection 210 may include stores 215 numbered "27" through "34", subsection 220 may include stores 225 numbered "2" through "7", subsection 230 may include stores 235 numbered "8" through "12", and subsection 240 may include stores 245 numbered "29" through "36". Though map 200 may include feature labels that identify individual stores by a name or number, for example, sizes of the individual stores may not be shown in map 200. Further, walls separating such individual stores may not be shown. Feature labels identifying individual stores may be located in map 200 only approximately. In other words, such feature labels may show an approximate location of an individual store and its location relative to other individual stores. For example, map 200 shows that a store labeled "31" in subsection 210 may be located between stores labeled "30" and "32". But walls separating stores "30", "31", and "32" are not shown. Moreover, map 200 may not show relative sizes of stores "30", "31", and "32".

As mentioned above, locations of walls separating rooms or individual stores may be approximated based, at least in part, on locations of feature labels provided in a digital map. In one implementation, such a digital map may be obtained or retrieved from a memory of a land-based computing platform or an MS. For example, map 200 of a shopping mall may identify boundaries between subsections 210, 220, 230, and 240, within the indoor region. However, map 200 may lack features of indoor structures such as doors, entry ways, or walls, for example. Though map 200 may lack some indoor structure features, the map may include feature labels, such as bathrooms, pay phones, room names, stores or store names, and so on.

Figure 3:
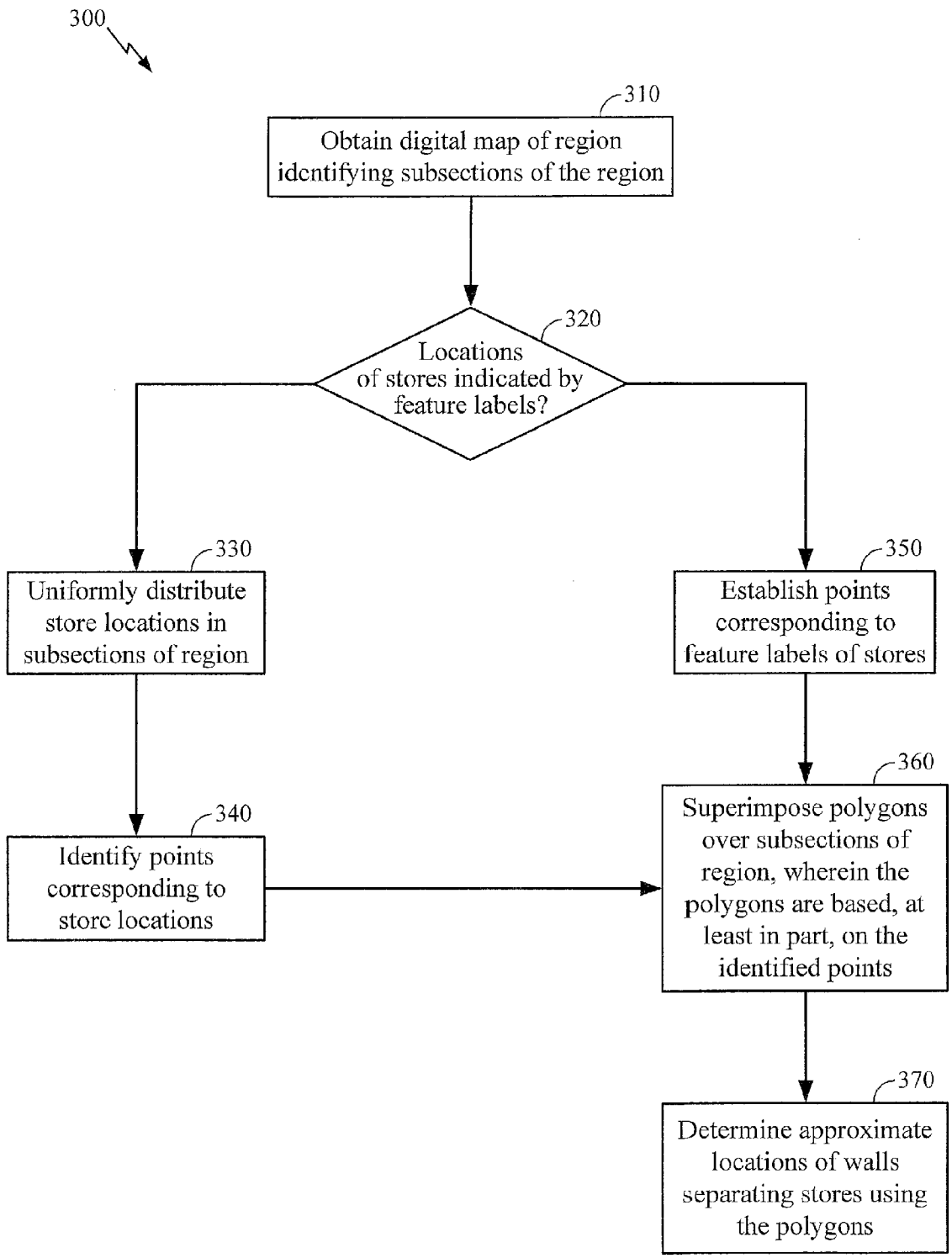
FIG. 3 is a flow diagram illustrating a process for determining approximate locations of walls of a building, according to an implementation.

FIG. 3 is a flow diagram illustrating a process 300 to approximate locations of walls or other indoor structures of a building based, at least in part, on feature labels in a map of the building. For example, such a map may comprise data representing feature labels and other indoor structures (e.g., walls, halls, doors, rooms, and so on) associated with particular locations of an area covered by the map. In an implementation, feature labels and other indoor structures associated with particular locations of an area covered by a map may be extracted from such data using code executed by a processor (e.g., general-purpose processor(s) 911 or processing unit 1020 shown in FIGS. 9 and 10, respectively). As discussed above, locations of walls or other building structures may be used for computing values of a radio heatmap, for example. In particular, values of a radio heatmap may be computed based, at least in part, on locations of access points and an approximation of locations of walls. Process 300 may be implemented in one or more land-based computing platforms or an MS, for example.

Figure 4:
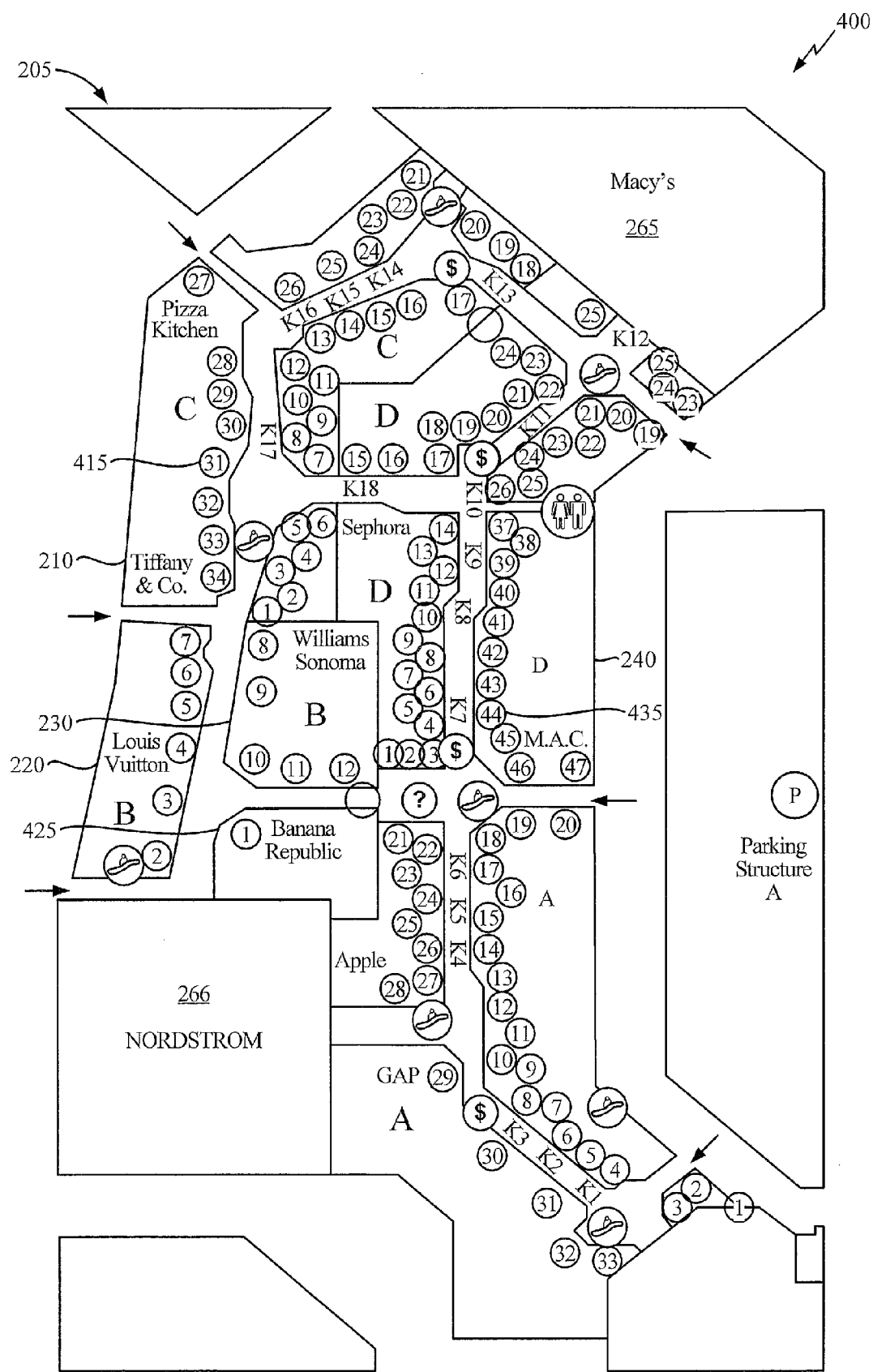
FIG. 4 is a map of a building complex including points of interest, according to an implementation.
Figure 5:
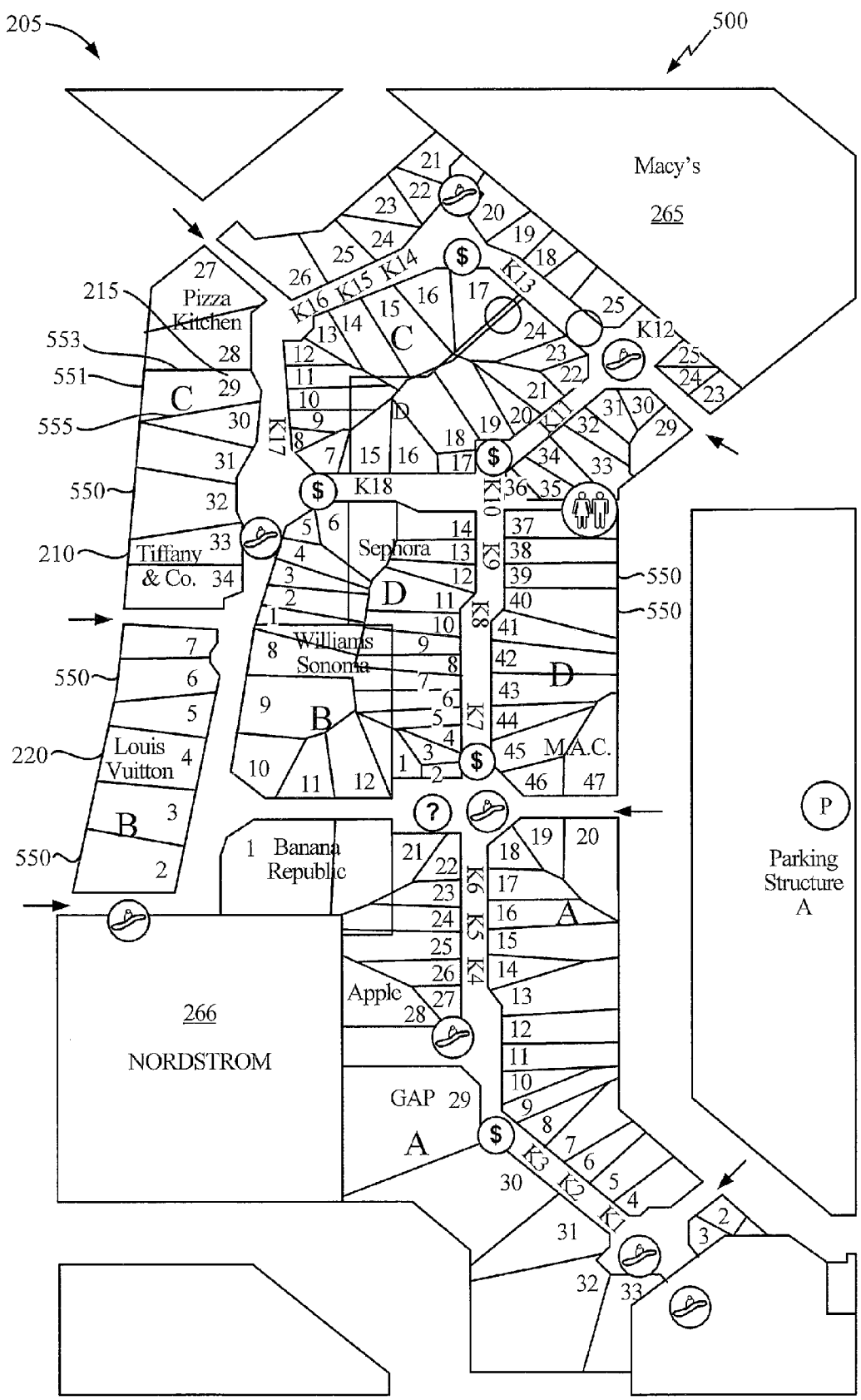
FIG. 5 is a map of a building complex including Voronoi cells, according to an implementation.

An example of a building described in process 300 may include building 205 shown in FIG. 2. Accordingly, FIGS. 4 and 5 illustrate example implementations of maps of building 205 during different portions of process 300. At block 310, a land-based computing platform or an MS may obtain a map, such as map 200 or 400, for example, of a region (e.g., an indoor or covered region) or building identifying subsections of the region. For example, subsections 210, 220, 230, and 240 may comprise individual building structures among a plurality of structures of building 205.

At diamond 320, a determination may be made as to whether the map includes feature labels that indicate at least approximate locations of stores in the subsections of the region. For example, map 200 includes feature labels 215 that indicate at least approximate locations of stores. If so, then process 300 may proceed to block 350, where points corresponding to feature labels may be established in map 200. For example, at block 350, points 415 or 435 corresponding to feature labels may be located (e.g., superimposed) at particular locations in map 400 based, at least in part, on locations of the feature labels. FIG. 4 shows such points as circled feature labels (e.g., circled numbers) that represent individual stores, for example.

At block 360, tessellation may be performed for points corresponding to feature labels identified in block 350. In particular, Voronoi tessellation may be performed for all points of a subsection. As shown in FIG. 5, for example, individual cells of Voronoi tessellation may be indicated by polygons superimposed over subsections of the region shown in map 500. Locations or shapes of the cells (e.g., polygons), in accordance with Voronoi tessellation, may be based, at least in part, on the points identified at block 350, for example. In one implementation, such Voronoi tessellation may comprise a "centroidal" tessellation, wherein a generating point of each Voronoi cell 550 may comprise a geometrical "center of mass". Any of a number of techniques may be used to generate centroidal Voronoi tessellations, including Lloyd's Algorithm used for K-means clustering, for example.

Some examples of Voronoi tessellations shown in FIG. 5 are now described. In subsection 210, feature labels comprising numbers "27" through "34" may correspond to individual stores (or rooms, for example). Generating points for individual feature labels may be located based, at least in part, on locations or separations among the feature labels. In one implementation, for example, an optical character recognition (OCR) engine may be used to identify a text phrase corresponding to a feature label in a digital map. A center of the text phrase may be used as a point for an individual feature labels. In another implementation, for example, a user may manually select (e.g., click a mouse while a pointer of the mouse is pointing to a portion of a digital map) known or estimated locations of points of interest on a map to obtain the point of interest location. In still another implementation, for example, for a given polygon outline of a building portion, points for individual feature labels may be evenly distributed based, at least in part, on a number of stores in the building portion. Such point generation may be performed at block 350, as described above, for example. Accordingly, based, at least in part, on such generating points, Voronoi cells 550 may be calculated and superimposed on map 500. As shown in FIG. 5, subsection 210 may comprise eight Voronoi cells, individually corresponding to feature labels "27", "28", "29", "30", "31", "32", "33", and "34", respectively. Similarly, subsection 220 may comprise six Voronoi cells, individually corresponding to feature labels "2", "3", "4", "5", "6", and "7", respectively. For example, Voronoi cell 551 in subsection 210 may be calculated based, at least in part, on a generating point corresponding to feature label "29". Voronoi cell 551 may comprise polygon sides 553 and 555. In an implementation, at block 370, such polygon sides may comprise approximations of locations of walls that separate stores represented by the feature labels. Thus, polygon side 553 may indicate an approximate location of a wall separating stores "28" and "29", and polygon side 555 may indicate an approximate location of a wall separating stores "30" and "29".

Returning to diamond 320, if the map obtained at block 310 does not include feature labels that indicate at least approximate locations of stores in the subsections of the region, then process 300 may proceed to block 330, where some assumptions (e.g., approximations) may be made as to locations of individual stores. In one implementation, locations of stores may be approximated based, at least in part, on a quantity of the stores. For example, if the number of stores in a particular subsection is known, the locations of the stores may be uniformly distributed in the subsection. Regarding such a uniform distribution, store locations or sizes may be adjusted based, at least in part, on names or stores or whether an anchor store is included in a particular subsection, for example, as explained in further detail below.

At block 340, points corresponding to individual stores in a subsection may be established and superimposed at particular locations in a map based, at least in part, on store locations approximated at block 330. Process 300 may then proceed to block 360, where tessellation may be performed for points corresponding to stores established in block 340. In particular, Voronoi tessellation may be performed for all points of a subsection. As discussed above, individual cells of Voronoi tessellation may be indicated by polygons 550 superimposed over subsections of the region shown in map 500. Locations or shapes of the cells (e.g., polygons), in accordance with Voronoi tessellation, may be based, at least in part, on the points established at block 340, for example. In one implementation, such Voronoi tessellation may comprise centroidal tessellation, wherein a generating point of each Voronoi cell 550 may comprise a geometrical "center of mass". At block 370, polygon sides corresponding to Voronoi cells may comprise approximations of locations of walls that separate stores, as explained above.

As explained above, a map may not include feature labels that show locations of stores. For example, diamond 320 of process 300 above may determine if such feature labels are present. In one implementation, if names of stores present in a subsection are known, but their locations within the subsection are unknown, then some assumptions (e.g., approximations) may be made as to locations of the stores. For example, a land-based computing platform or an MS performing process 300 (or a similar process) may use a lookup table to infer a size of a store based, at least in part, on the name of the store. For example, it may be relatively commonplace for a store in a shopping mall to comprise one of a chain of stores (e.g., nationwide) having sizes similar to one another. Accordingly, a lookup table may correlate a name of a store with a size of the store. Tessellation for a subsection may then be performed based, at least in part, on sizes of stores in the subsection. For example, generating points for Voronoi cells may be located or distributed in a map of a subsection based, at least in part, on sizes of stores inferred by using a lookup table.

In another implementation, returning to block 330 of process 300, locations of uniformly distributed stores (or feature labels corresponding to stores) in a subsection may be modified based, at least in part, on names of stores. As just described above, a lookup table may be used to infer a size of store based, at least in part, on its name. In yet another implementation, a subsection may comprise an anchor store, such as subsection 425 in FIG. 4, for example. In such a case, a land-based computing platform or an MS performing process 300 (or a similar process) may use a lookup table to infer a size of the anchor store based, at least in part, on the name of the store. For example, it may be relatively commonplace for an anchor store in a shopping mall to comprise one of a chain of stores (e.g., nationwide) having sizes similar to one another. Accordingly, a lookup table may correlate a name of an anchor store with a size of the store. Tessellation for a subsection may then be performed based, at least in part, on a size of the anchor store. If such an anchor store is located in a subsection with one or more other (smaller) stores, the size of the anchor store may introduce constraints for locating or distributing generating points for Voronoi cells. In another implementation, approximating locations of walls may be constrained based, at least in part, on the size of an anchor store. Accordingly, approximating locations of walls separating an anchor store and other stores from one another may be based, at least in part, on such constraints. Of course, such details of process 300 are merely examples, and claimed subject matter is not so limited.

FIG. 6 is a map 600 of a portion of a building including approximated wall locations 655, according to an implementation. For example, such approximated wall locations may have been determined using process 300, as explained above. An access point 605 and a number of lines representing lines-of-sight from access point 605 to various rooms are shown. Approximating wall locations may be useful for computing a radio heatmap comprising RSSI values. As mentioned above, an expected RSSI value at a particular location may depend, at least in part, on the number of walls (e.g., along a line-of-sight) that a probe response signal transmitted by an access point travels through to arrive at the particular location. For example, an RSSI value at location 612 in Voronoi cell 610 may be computed by considering that a line-of-sight 640 from access point 605 crosses eight walls.

Figure 7:
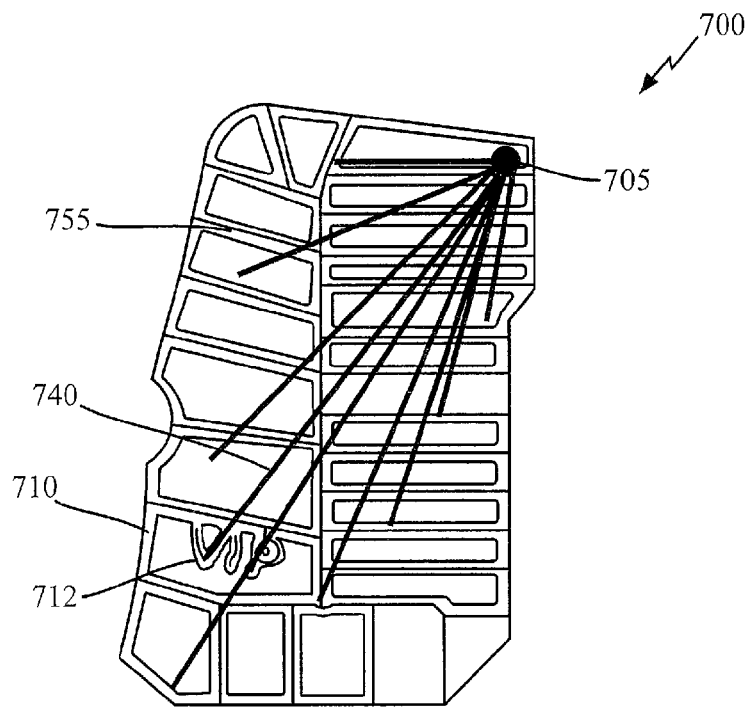
FIG. 7 is a map of a portion of a building complex including actual wall locations, according to an implementation.

FIG. 7 is a map 700 of a portion of a building including actual (e.g., ground-truth) wall locations 755, according to an implementation. An access point 705 and a number of lines representing lines-of-sight from access point 705 to various rooms are shown. Wall locations may be useful for computing a radio heatmap comprising RSSI values. For example, an RSSI value at location 712 in Voronoi cell 710 may be computed by considering that a line-of-sight 740 from access point 705 crosses nine walls.

Comparing approximated wall locations shown in FIG. 6 to actual wall locations shown in FIG. 7, the approximated wall locations may be at least sufficiently close to actual wall locations to allow for computing values of a radio heatmap. In the example above, line-of-sight 640 crossed eight (approximated) walls whereas line-of-sight 740 crossed nine (actual) walls. Such a discrepancy may be acceptable considering that, using techniques described herein, values of a radio heatmap may be computed using a map that provides feature labels or store names but not wall locations.

Figure 8:
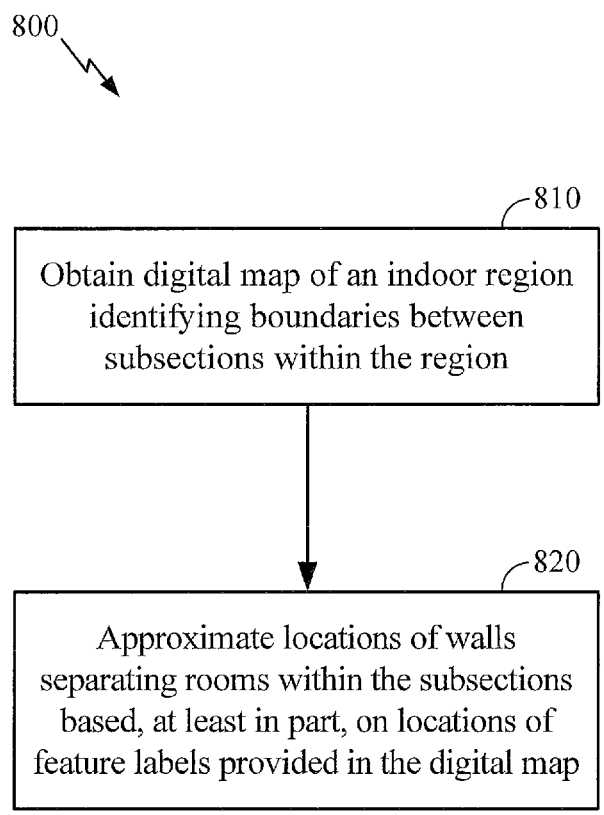
FIG. 8 is a flow diagram illustrating a process for determining approximate locations of walls of a building, according to an implementation.

FIG. 8 is a flow diagram illustrating a process 800 to approximate locations of walls or other indoor structures of a building based, at least in part, on feature labels in a map of the building. As discussed above, locations of walls or other building structures may be used for computing RSSI values for a radio heatmap, for example. In particular, values of a radio heatmap may be computed based, at least in part, on locations of access points and an approximation of locations of walls. Process 800 may be implemented in one or more land-based computing platforms or an MS, for example. At block 810, a digital map of an indoor region may be obtained. Such a digital map may identify boundaries between subsections within the region, as described above. At block 820, locations of walls separating rooms within the subsections may be approximated based, at least in part, on locations of feature labels provided in the digital map. Of course, such details of process 800 are merely examples, and claimed subject matter is not so limited.

Figure 9:
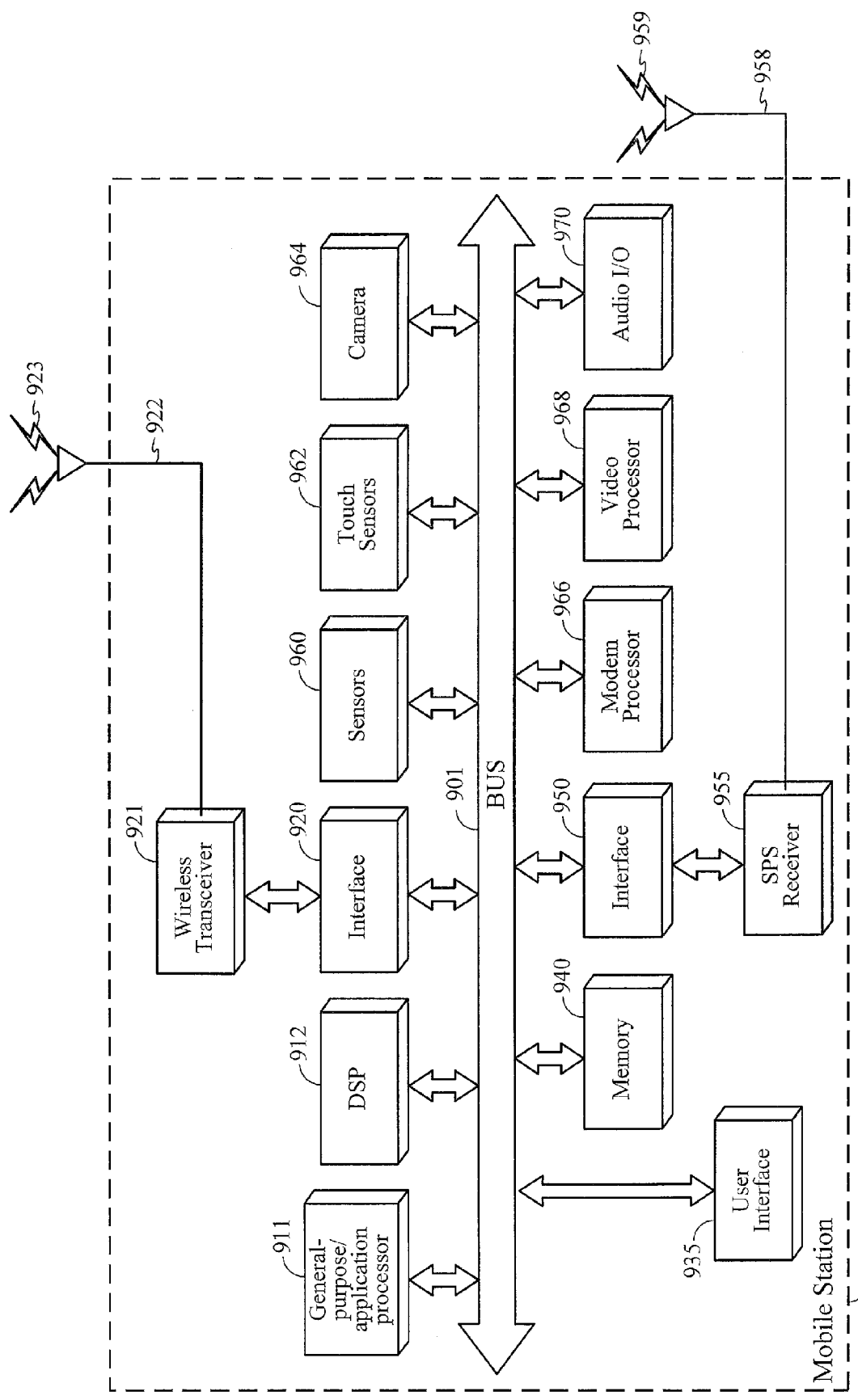
FIG. 9 is a schematic block diagram illustrating an exemplary mobile station, in accordance with an implementation.

FIG. 9 is a schematic diagram of an MS according to an implementation. MS 900 may comprise one or more features of MS 100 shown in FIG. 1, for example. In certain implementations, MS 900 may also comprise a wireless transceiver 921 which is capable of transmitting and receiving wireless signals 923 via an antenna 922 over a wireless communication network, such as over a wireless communication link 123, shown in FIG. 1, for example. Wireless transceiver 921 may be connected to bus 901 by a wireless transceiver bus interface 920. Wireless transceiver bus interface 920 may, in some implementations be at least partially integrated with wireless transceiver 921. Some implementations may include multiple wireless transceivers 921 and wireless antennas 922 to enable transmitting and/or receiving signals according to a corresponding multiple wireless communication standards such as, for example, WiFi, CDMA, WCDMA, LTE and Bluetooth, just to name a few examples.

MS 900 may also comprise SPS receiver 955 capable of receiving and acquiring SPS signals 959 via SPS antenna 958. SPS receiver 955 may also process, in whole or in part, acquired SPS signals 959 for estimating a location of MS 1000. In some implementations, general-purpose processor(s) 911, memory 940, DSP(s) 912 and/or specialized processors (not shown) may also be utilized to process acquired SPS signals, in whole or in part, and/or calculate an estimated location of MS 900, in conjunction with SPS receiver 955. Storage of SPS or other signals for use in performing positioning operations may be performed in memory 940 or registers (not shown).

Also shown in FIG. 9, MS 900 may comprise digital signal processor(s) (DSP(s)) 912 connected to the bus 901 by a bus interface 910, general-purpose processor(s) 911 connected to the bus 901 by a bus interface 910 and memory 940. Bus interface 910 may be integrated with the DSP(s) 912, general-purpose processor(s) 911 and memory 940. In various implementations, functions or processes, such as processes 300 or 800 shown in FIGS. 3 and 8, for example, may be performed in response to execution of one or more machine-readable instructions stored in memory 940 such as on a computer-readable storage medium, such as RAM, ROM, FLASH, or disc drive, just to name a few example. The one or more instructions may be executable by general-purpose processor(s) 911, specialized processors, or DSP(s) 912. In one implementation, for example, one or more machine-readable instructions stored in memory 940 may be executable by a processor(s) 911 to: evaluate a digital map of an indoor region to identify boundaries between subsections within the region; and approximate locations of walls separating rooms within at least one of the subsections based, at least in part, on locations of feature labels provided in the digital map. Memory 940 may comprise a non-transitory processor-readable memory and/or a computer-readable memory that stores software code (programming code, instructions, etc.) that are executable by processor(s) 911 and/or DSP(s) 912 to perform functions described herein.

Also shown in FIG. 9, a user interface 935 may comprise any one of several devices such as, for example, a speaker, microphone, display device, vibration device, keyboard, touch screen, just to name a few examples. In a particular implementation, user interface 935 may enable a user to interact with one or more applications hosted on MS 900. For example, devices of user interface 935 may store analog or digital signals on memory 940 to be further processed by DSP(s) 912 or general purpose processor 911 in response to action from a user. Similarly, applications hosted on MS 900 may store analog or digital signals on memory 940 to present an output signal to a user. In another implementation, MS 900 may optionally include a dedicated audio input/output (I/O) device 970 comprising, for example, a dedicated speaker, microphone, digital to analog circuitry, analog to digital circuitry, amplifiers and/or gain control. It should be understood, however, that this is merely an example of how an audio I/O may be implemented in an MS, and that claimed subject matter is not limited in this respect. In another implementation, MS 900 may comprise touch sensors 962 responsive to touching or pressure on a keyboard or touch screen device.

MS 900 may also comprise a dedicated camera device 964 for capturing still or moving imagery. Camera device 964 may be used as an environmental sensor, for example. Camera device 964 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 911 or DSP(s) 912. Alternatively, a dedicated video processor 968 may perform conditioning, encoding, compression or manipulation of signals representing captured images. Additionally, video processor 968 may decode/decompress stored image data for presentation on a display device 981 on MS 900.

MS 900 may also comprise sensors 960 coupled to bus 901 which may include, for example, inertial sensors and environment sensors that may be used for ground-truth measurements, as described above. Inertial sensors of sensors 960 may comprise, for example accelerometers (e.g., collectively responding to acceleration of MS 900 in three dimensions), one or more gyroscopes or one or more magnetometers (e.g., to support one or more compass applications). Environment sensors of MS 900 may comprise, for example, temperature sensors, barometric pressure sensors, ambient light sensors, camera imagers, and microphones, just to name few examples. Sensors 960 may generate analog or digital signals that may be stored in memory 940 and processed by DPS(s) or general purpose processor 911 in support of one or more applications such as, for example, applications directed to positioning or navigation operations.

In a particular implementation, MS 900 may comprise a dedicated modem processor 966 capable of performing baseband processing of signals received and downconverted at wireless transceiver 921 or SPS receiver 955. Similarly, modem processor 966 may perform baseband processing of signals to be upconverted for transmission by wireless transceiver 921. In alternative implementations, instead of having a dedicated modem processor, baseband processing may be performed by a general purpose processor or DSP (e.g., general purpose/application processor 911 or DSP(s) 912). It should be understood, however, that these are merely examples of structures that may perform baseband processing, and that claimed subject matter is not limited in this respect.

Figure 10:
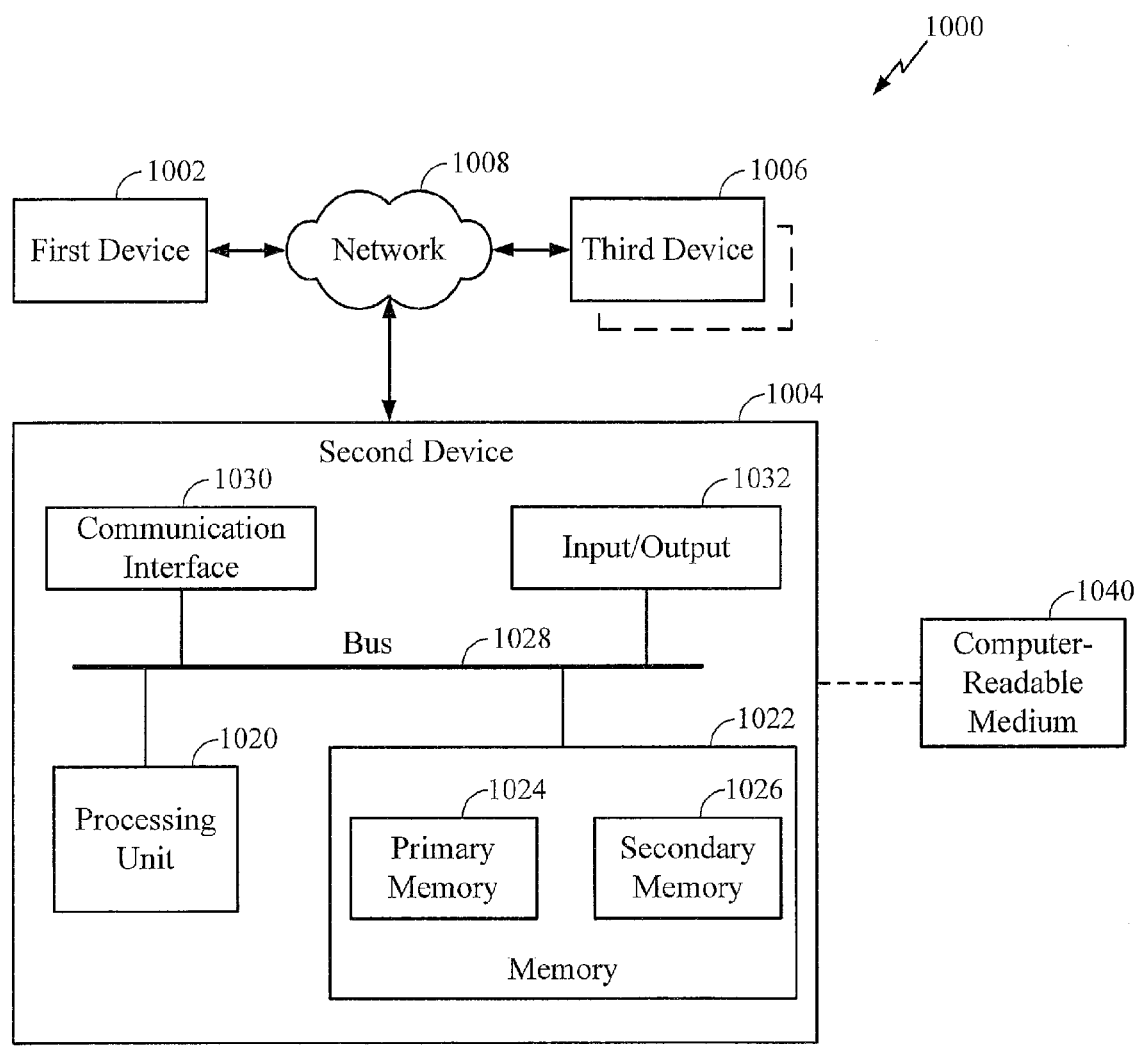
FIG. 10 is a schematic block diagram of an example computing platform.

FIG. 10 is a schematic diagram illustrating an example system 1000 that may include one or more devices configurable to implement techniques or processes, such as process 300 described above, for example, in connection with FIG. 3. System 1000 may include, for example, a first device 1002, a second device 1004, and a third device 1006, which may be operatively coupled together through a wireless communications network 1008. In an aspect, first device 1002 may comprise a server capable of providing positioning assistance data such as, for example, a base station almanac. First device 1002 may also comprise a server capable of providing an LCI to a requesting MS based, at least in part, on a rough estimate of a location of the requesting MS. First device 1002 may also comprise a server capable of providing indoor positioning assistance data relevant to a location of an LCI specified in a request from an MS. Second and third devices 1004 and 1006 may comprise MSs, in an aspect. Also, in an aspect, wireless communications network 1008 may comprise one or more wireless access points, for example. However, claimed subject matter is not limited in scope in these respects.

First device 1002, second device 1004 and third device 1006, as shown in FIG. 10, may be representative of any device, appliance or machine that may be configurable to exchange data over wireless communications network 1008. By way of example but not limitation, any of first device 1002, second device 1004, or third device 1006 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1002, 1004, and 1006, respectively, may comprise one or more of a base station almanac server, a base station, or an MS in accordance with the examples described herein.

Similarly, wireless communications network 1008, as shown in FIG. 10, is representative of one or more communication links, processes, or resources configurable to support the exchange of data between at least two of first device 1002, second device 1004, and third device 1006. By way of example but not limitation, wireless communications network 1008 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1006, there may be additional like devices operatively coupled to wireless communications network 1008.

It is recognized that all or part of the various devices and networks shown in system 1000, and the processes and methods as further described herein, may be implemented using or otherwise including hardware, firmware, software, or any combination thereof.

Thus, by way of example but not limitation, second device 1004 may include at least one processing unit 1020 that is operatively coupled to a memory 1022 through a bus 1028. In one implementation, for example, one or more machine-readable instructions stored in memory 1022 may be executable by processing unit 1020 to: receive a conceptual map of a navigable area, wherein the conceptual map may include two or more topological elements being related to one another in the conceptual map by a first set of dimensions; apply one or more ground truth measurements or topological constraints to the first set of dimensions of the conceptual map to provide a modified map having corrected dimensions; and map an estimated location of a mobile station to the modified map.

Processing unit 1020 is representative of one or more circuits configurable to perform at least a portion of a data computing procedure or process. By way of example but not limitation, processing unit 1020 may include one or more processors, controllers, microprocessors, microcontrollers, application specific integrated circuits, digital signal processors, programmable logic devices, field programmable gate arrays, and the like, or any combination thereof.

Memory 1022 is representative of any data storage mechanism. Memory 1022 may include, for example, a primary memory 1024 or a secondary memory 1026. Primary memory 1024 may include, for example, a random access memory, read only memory, etc. While illustrated in this example as being separate from processing unit 1020, it should be understood that all or part of primary memory 1024 may be provided within or otherwise co-located/coupled with processing unit 1020.

Secondary memory 1026 may include, for example, the same or similar type of memory as primary memory or one or more data storage devices or systems, such as, for example, a disk drive, an optical disc drive, a tape drive, a solid state memory drive, etc. In certain implementations, secondary memory 1026 may be operatively receptive of, or otherwise configurable to couple to, a computer-readable medium 1040. Computer-readable medium 1040 may include, for example, any non-transitory medium that can carry or make accessible data, code or instructions for one or more of the devices in system 1000. Computer-readable medium 1040 may also be referred to as a storage medium.

Second device 1004 may include, for example, a communication interface 1030 that provides for or otherwise supports the operative coupling of second device 1004 to at least wireless communications network 1008. By way of example but not limitation, communication interface 1030 may include a network interface device or card, a modem, a router, a switch, a transceiver, and the like.

Second device 1004 may include, for example, an input/output device 1032. Input/output device 1032 is representative of one or more devices or features that may be configurable to accept or otherwise introduce human or machine inputs, or one or more devices or features that may be configurable to deliver or otherwise provide for human or machine outputs. By way of example but not limitation, input/output device 1032 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more MSs may communicate with a femto cell via a code division multiple access ("CDMA") cellular communication protocol, for example, and the femto cell may provide the MS access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   obtaining, from a memory, a digital map of an indoor region that identifies boundaries between subsections within the indoor region;
   extracting feature labels from the digital map and establishing points based on locations of the extracted feature labels;
   approximating locations of walls separating rooms within at least one of the subsections by superimposing polygons over the subsections within the indoor region based on the established points; and
   generating heat map values at a plurality of points within at least one subsection based on an estimated number of walls crossed between the plurality of points and at least one transceiver.

2. The method of claim 1, wherein the feature labels identify one or more points of interest.

3. The method of claim 1, wherein the feature labels comprise names of one or more stores.

4. The method of claim 3, further comprising:
   approximating the locations of the feature labels based on a quantity of the one or more stores.

5. The method of claim 3, further comprising:
   modifying the locations of the feature labels based on the names of the one or more stores.

6. The method of claim 1, wherein the polygons comprise Voronoi cells.

7. The method of claim 1, further comprising:
   determining routeability for at least a portion of the indoor region based on the approximated locations of walls.

8. The method of claim 1, further comprising:
   computing values of a radio heatmap database based on locations of transceivers and the approximated locations of walls.

9. The method of claim 8, wherein the radio heatmap database comprises received signal strength indicator (RSSI) values.

10. The method of claim 1, wherein at least one of the subsections within the indoor region comprises an anchor store of a shopping mall, the method further comprising:
determining a size of the anchor store based on a lookup table; and
constraining the approximating locations of walls based on the determined size.

11. An apparatus comprising:
means for obtaining a digital map of an indoor region that identifies boundaries between subsections within the indoor region;
means for extracting feature labels from the digital map and establishing points based on locations of the extracted feature labels;
means for approximating locations of walls separating rooms within at least one of the subsections by superimposing polygons over the subsections within the indoor region based on the established points; and
means for generating heat map values at a plurality of points within the at least one polygon based on an estimated number of walls crossed between the plurality of points and at least one transceiver.

12. The apparatus of claim 11, wherein the feature labels identify one or more points of interest.

13. The apparatus of claim 11, wherein the feature labels comprise names of one or more stores.

14. The apparatus of claim 13, further comprising:
means for approximating the locations of the feature labels based-on a quantity of the one or more stores.

15. The apparatus of claim 13, further comprising:
means for modifying the locations of the feature labels based on the names of the one or more stores.

16. The apparatus of claim 11, wherein the polygons comprise Voronoi cells.

17. The apparatus of claim 11, further comprising:
means for determining routeability for at least a portion of the indoor region based on the approximated locations of walls.

18. The apparatus of claim 11, further comprising:
means for computing values of a radio heatmap database based on locations of transceivers and the approximated locations of walls.

19. The apparatus of claim 18, wherein the radio heatmap database comprises received signal strength indicator (RSSI) values.

20. The apparatus of claim 11, wherein at least one of the subsections within the indoor region comprises an anchor store of a shopping mall, the apparatus further comprising:
means for determining a size of the anchor store based on a lookup table; and
means for constraining the approximated locations of walls based on the determined size.

21. An apparatus comprising:
a receiver to receive wireless signals; and
one or more processing units configured to:
obtain, from a memory, a digital map of an indoor region that identifies boundaries between subsections within the indoor region;
extract feature labels from the digital map and establish points based on locations of the extracted feature labels;
approximate locations of walls separating rooms within at least one of multiple subsections by superimposing polygons over the subsections within the indoor region based on the established points; and
generate heat map values at a plurality of points within the at least one subsection based on the estimated number of walls crossed between the plurality of points and at least one transceiver.

22. The apparatus of claim 21, wherein the feature labels identify one or more points of interest.

23. The apparatus of claim 21, wherein the feature labels comprise names of one or more stores.

24. The apparatus of claim 23, wherein the one or more processing units are further configured to:
approximate said locations of the feature labels based on a quantity of the one or more stores.

25. The apparatus of claim 23, wherein the one or more processing units are further configured to:
modify said locations of the feature labels based on the names of the one or more stores.

26. The apparatus of claim 21, wherein the polygons comprise Voronoi cells.

27. The apparatus of claim 21, wherein the one or more processing units are further configured to:
determine routeability for at least a portion of the indoor region based on the approximated locations of walls.

28. The apparatus of claim 21, further comprising one or more processing units configured to:
compute values of a radio heatmap database based on locations of transceivers and the approximated locations of walls.

29. The apparatus of claim 28, wherein the radio heatmap database comprises received signal strength indicator (RSSI) values.

30. The apparatus of claim 21, wherein the at least one of the subsections within the indoor region comprises an anchor store of a shopping mall, and wherein the one or more processing units are further configured to:
determine a size of the anchor store based on a lookup table; and
constrain the approximated locations of walls based on the determined size.

31. An article comprising: a non-transitory storage medium comprising machine-readable instructions stored thereon that are executable by a special purpose computing device to:
evaluate a digital map of an indoor region to identify boundaries between subsections within the indoor region;
extract feature labels from the digital map and establish points based on locations of the extracted feature labels;
approximate locations of walls separating rooms within at least one of the subsections by superimposing polygons over the subsections within the indoor region based on the established points; and
generate heat map values at a plurality of points within the at least one polygon based on an estimated number of walls crossed between the plurality of points and at least one transceiver.

32. The article of claim 31, wherein the feature labels identify one or more points of interest.

33. The article of claim 31, wherein the feature labels comprise names of one or more stores.

34. The article of claim 33, further comprising machine-readable instructions stored thereon that are executable by the special purpose computing device to:
approximate the locations of the feature labels based on a quantity of the one or more stores.

35. The article of claim 33, further comprising machine-readable instructions stored thereon that are executable by the special purpose computing device to:
  modify the locations of the feature labels based on the names of the one or more stores.

36. The article of claim 31, wherein the polygons comprise Voronoi cells.

37. The article of claim 36, wherein the Voronoi cells are generated based on the locations of said feature labels.

38. The article of claim 31, further comprising machine-readable instructions stored thereon that are executable by the special purpose computing device to:
  determine routeability for at least a portion of the indoor region based on the approximated locations of walls.

39. The article of claim 31, further comprising machine-readable instructions stored thereon that are executable by the special purpose computing device to:
  compute values of a radio heatmap database based on locations of transceivers and the approximated locations of walls.

40. The article of claim 39, wherein the radio heatmap database comprises received signal strength indicator (RSSI) values.

41. The article of claim 31, wherein at least one of the subsections within the indoor region comprises an anchor store of a shopping mall, the article further comprising machine-readable instructions stored thereon that are executable by the special purpose computing device to:
  determine a size of the anchor store based on a lookup table; and
  constrain the approximated locations of walls based on the determined size.

* * * * *